United States Patent [19]

Dona

[11] 4,166,673
[45] Sep. 4, 1979

[54] SIGNAL DEVICE HAVING ADJUSTABLE CODING INDICATORS

[75] Inventor: Raymond D. Dona, Berlin, Mass.

[73] Assignee: Mekontrol, Inc., Northboro, Mass.

[21] Appl. No.: 870,111

[22] Filed: Jan. 17, 1978

Related U.S. Application Data

[63] Continuation-in-part of Ser. No. 741,601, Nov. 15, 1976, abandoned, which is a continuation of Ser. No. 587,432, Jun. 16, 1975, abandoned.

[51] Int. Cl.² .................. G02B 5/124; G01N 21/30
[52] U.S. Cl. .................................. 350/97; 116/204; 198/349; 209/583; 250/223 R
[58] Field of Search ............... 116/114 K, 114 R; 40/106.45; 73/DIG. 5; 198/349, 350; 250/223 R; 335/306; 35/24 B; 350/97, 100

[56] References Cited

U.S. PATENT DOCUMENTS

| | | | |
|---|---|---|---|
| 1,694,639 | 12/1928 | Brown | 116/114 K |
| 1,860,979 | 5/1932 | Barker | 40/106.45 |
| 2,589,812 | 3/1952 | Hoskins | 35/24 B |
| 3,168,268 | 2/1965 | Bossart et al. | 198/350 X |
| 3,168,787 | 2/1965 | Surrey | 116/135 |
| 3,224,128 | 12/1965 | Steward | 40/106.45 X |
| 3,227,886 | 1/1966 | Dunigan et al. | 198/349 |
| 3,293,579 | 12/1966 | Harper | 73/DIG. 5 |
| 3,339,297 | 9/1967 | Stinn et al. | 116/114 K X |
| 3,499,521 | 3/1970 | Gildehaus | 198/350 |
| 3,536,182 | 10/1970 | Rehrig | 198/350 X |
| 3,560,073 | 2/1971 | Knapp | 350/97 |
| 3,581,704 | 6/1971 | Connell | 116/114 R |
| 3,739,181 | 6/1973 | Vincent, Jr. | 250/223 R X |
| 3,854,109 | 12/1974 | Gotanda | 335/306 |

*Primary Examiner*—Daniel M. Yasich
*Attorney, Agent, or Firm*—Norman S. Blodgett; Gerry A. Blodgett

[57] ABSTRACT

Signal device for providing machine-readable indicia on an object, the device allowing the form of the indicia to be deliberately changed, but not accidentally. Reflective indicating means are slidable in a series of parallel tracks. Magnetic attraction between the track and the indicating means cause the indicating means to engage detents in the track and remain in selected locations.

22 Claims, 6 Drawing Figures

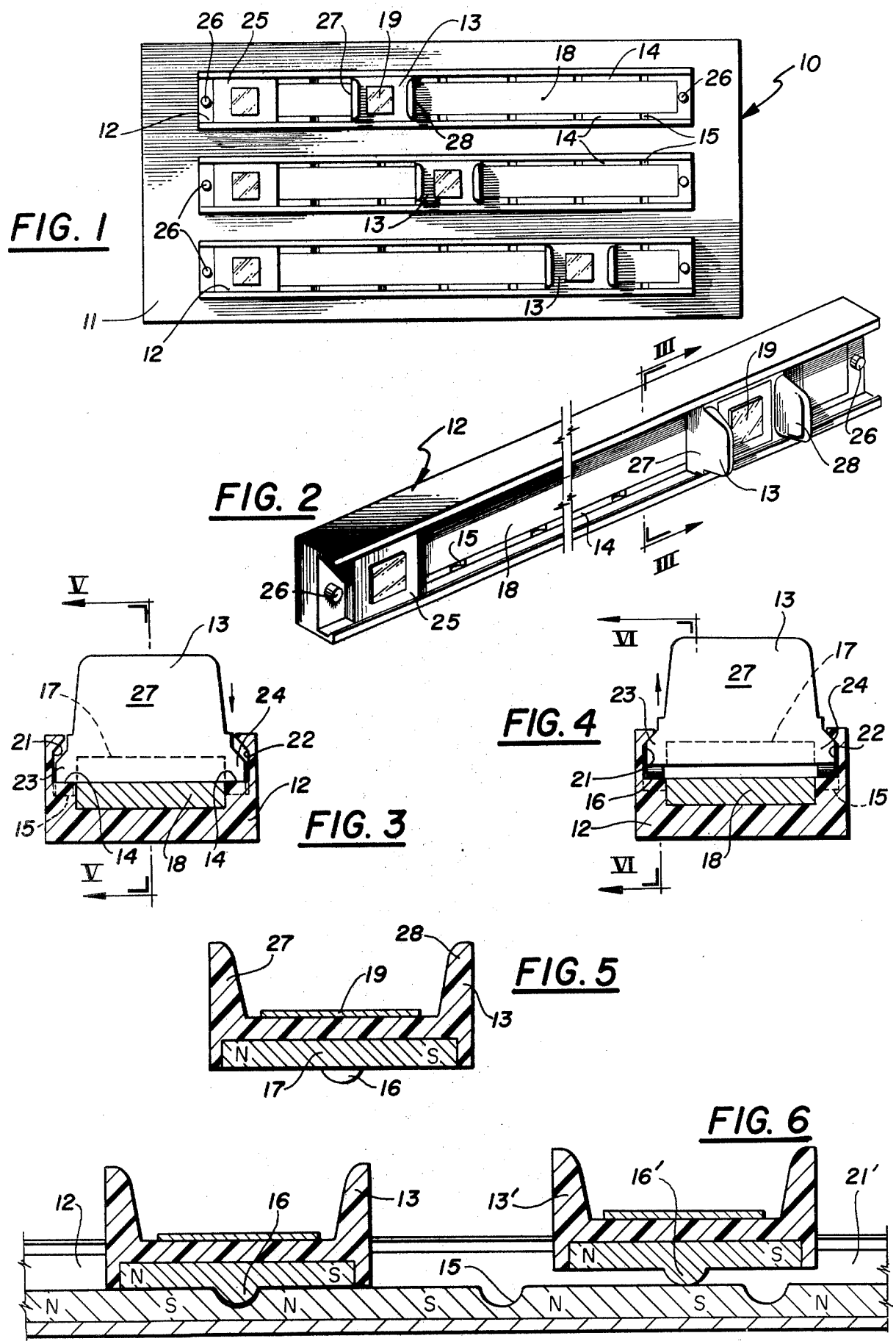

SIGNAL DEVICE HAVING ADJUSTABLE CODING INDICATORS

REFERENCE TO RELATED APPLICATIONS

This application is a continuation-in-part of application Ser. No. 741,601 filed Nov. 15, 1976, now abandoned, which is a continuation of application Ser. No. 587,432 filed June 16, 1975, now abandoned.

BACKGROUND OF THE INVENTION

An important aspect of modern material handling is the development of mechanical readers for determining the nature of an article and subsequently directing it to its proper destination. One method of providing such a mechanical identification system is shown in the Dunigan et al patent No. 3,227,886, issued Jan. 4, 1966, wherein a retro-reflective pattern of spots is placed on a standard material container and a series of photocells can "read" the pattern. An important aspect of the Dunigan patent involves the provision of a series of retro-reflective indicating means which are slidable in a series of tracks which are parallel to the direction of motion of the container. Each indicating means can be selectively locked in one of a series of discrete locations along the length of the track, but can also be rendered slidable along the track to change location. In the Dunigan patent, the indicating means is spring-loaded outwardly of the track to engage a notch in the outer edge of the track. The system must satisfy two competing requirements: first, the indicating means must be smoothly and easily moved among the various discrete locations when movement is desired and, secondly, the indicating means must be positively locked against movement due to the physical shocks which normally occur in material handling. Although a properly-manufactured version of the Dunigan design functions quite well in these respects, inexpensive versions of the design have proved unsatisfactory.

Various alternative designs of the basic structure have been attempted in order to avoid manufacturing difficulties. For example, in one design the indicating means is placed in a smoothly slidable track, the bottom of the track being composed of an elongated strip of magnetized metal having closely-spaced alternations of magnetic pole along its length. The indicating means is also a magnet with the North-South poles arranged parallel to the length of the track. The result is that the indicating means is alternately attracted and repulsed as it moves along the length of the track. Thus, the indicating means can be pushed along the length of the track, but will normally be magnetically held in one of several discrete locations. Although this design does overcome some manufacturing problems of other designs, it has some material-economics problems of its own and the indicating means has a tendency to change position when exposed to extreme physical shock. These and other difficulties experienced with the prior art devices have been obviated in a novel manner by the present invention.

It is, therefore, an outstanding object of the invention to provide a signal device for providing an easily changeable, machine-readable indicia on an object.

Another object of this invention is the provision of a signal device which can be easily deliberately changed when desired, but which will not change accidentally even when exposed to extreme physical shock.

A further object of the present invention is the provision of a signal device which is simple in construction, inexpensive to manufacture, and capable of along life of useful service.

With these and other objects in view, as will be apparent to those skilled in the art, the invention resides in the combination of parts set forth in the specification and covered by the claims appended hereto.

SUMMARY OF THE INVENTION

In general, the present invention has to do with a signal device for creating on an object an easily changeable, machine-readable code. The device involves a series of tracks arranged parallel to the direction of motion of the object. In each track is slidably mounted an indicating means which carries a piece of retro-reflective material. A series of detents are spaced along the length of each track and each indicating means may be placed in engagement with one of the detents and held in such engagement by magnetic attraction between the indicating means and the track.

BRIEF DESCRIPTION OF THE DRAWINGS

The character of the invention, however, may be best understood by reference to one of its structural forms, as illustrated by the accompanying drawings, in which:

FIG. 1 is a front elevational view of a signal device embodying the principles of the present invention, FIG. 2 is a perspective view of a portion of the signal device, FIG. 3 is a sectional view of the signal device taken along the line III—III of FIG. 2, FIG. 4 is a sectional view of the signal device taken along the line III—III of FIG. 2, but in a different condition, FIG. 5 is a sectional view of the signal device taken along the line V—V of FIG. 3, and FIG. 6 is a sectional view of the signal device taken on the line VI—VI of FIG. 4.

DESCRIPTION OF THE PREFERRED EMBODIMENT

Referring first to FIG. 1, in which are shown the general features of the present invention, the signal device, designated generally by the numeral 10, is shown as including a base 11, three plastic tracks 12, and three indicators or indicating members 13, one slidable in each track. The base 11 consists of a large rectangular plate of sheet steel to which the tracks 12 are attached.

Referring to FIG. 2, the track 12 is shown to include a bottom which is parallel and is attached to the base 11 with two outwardly-extending side walls. The outward portion of the bottom consists of two surfaces 14 with a magnetic strip 18 between them.

Referring to FIG. 1, it can be seen that each magnetic strip 18 extends along the length of its track. The magnetic strip 18 may be formed as a single, elongated magnet formed with alternations in polarity along its length or a number of discrete magnets laid end-to-end. The surfaces 14 are shown as having periodic irregularities acting as first detent elements along their length. In the preferred embodiment these detent elements are grooves of semi-circular cross-section. At each end of the tracks are stop posts 26.

As shown in FIG. 1, the indicating means 13 are mounted in the tracks 12. Each indicating means has an outer surface on which is mounted a piece 19 of light reflective material, which in this case is retro-reflective tape. Extending outwardly from the right and left ends of the outer surface are arms 27 and 28.

Referring to FIGS. 3 and 4, the side walls of each track 12 are shown to have opposed grooves 21 and 22 of a width measured perpendicular to the base 11. Each indicating means is shown to include rails 23 and 24 which slidably engage the grooves 21 and 22, respectively. The rails have a width less than the width of the grooves, thereby allowing not only motion longitudinally of the track, but also motion perpendicular to the plane of the base 11. Each indicating means is also shown to include a second magnetic element 17 which is magnetically attracted to the first magnetic element 18 at least in certain positions along the track. The magnetic element 17 has its poles oriented on the horizontal ends of the indicating means which is shape-conforming or complimentary to the first detent element 15 formed in the surface 14. In the preferred embodiment, these detent elements 16 are projections of semi-circular cross-section, as best shown in FIG. 5.

Also shown in FIGS. 1 and 2, the end of each track is provided with a stop block 25 which is a semi-permanent part of the track. The block 25 is similar in construction to the indicating means, except that the rails of the block are equal in vertical width to that of the side wall grooves, thereby presenting motion of the block in the direction perpendicular to the plane of the base 11. Furthermore, the block 25 does not contain a magnetic element, but it does have notches or detent elements 16. When the stop block has been forced into the track by flexing the side walls and the detent elements 16 are allowed to engage the grooves or detent elements 15, a semi-permanent structure is formed.

The operation of the present invention will now be readily understood in view of the above description. The signal device shown in FIG. 1 would normally be attached to the side of a standard container in which various materials are stored. The container would then be caused to move past an optical reader, the direction being parallel to the length of the tracks. The optical reader would send out a pattern of beams of light, which beams would return to the reader if they encountered pieces 19 of retro-reflective material. Certain patterns of returning light beams woud cause the reader to initiate certain operations, such as re-directing the container.

In order to change the pattern of the indicating means to indicate the contents of the container, each indicating means can be manually moved along its track. In their normal position, the first detent element 16 of the indicating means and the second detent element 15 of the surface 14 are drawn into shape-conforming engagement by the attraction between the first magnetic element 17 and the second magnetic element 18. This attraction occurs because both of the magnetic elements are magnets and the magnets are arranged with opposite poles adjacent one another. Because of the engagement of the detent elements, the grooves form a series of discrete locations for the indicating means along the length of the track.

To move one of the indicating means 13 between discrete locations, manual pressure is applied parallel to the length of the track on one of the arm 27 and 28. As shown in FIG. 4, this pressure results in a lifting of the detent element 16 from the detent element 15 and in a upward movement of the rails 23 and 24 in the side wall grooves 21 and 22. The separation of the magnetic elements 17 and 18 reduces their attraction for one another and allows the indicating means to be easily moved along the track to a new discrete location. Thus, in FIG. 6 the indicating element 13 is shown in a discrete location with the detent elements engaged, while the indicating element 13' is shown between discrete locations with the magnetic elements separated and the detent element 16' of the indicating element 13' riding on the surface 14. Each of the indicating means is movable along the track until it encounters a stopping post 26 or a semi-permanent block 25. The shape of the detent elements can be selected so that the indicating means is held in its selected position even during severe physical shock, but which can be moved easily between its positions by application of manual force. The ease by which the indicating means can be manually moved is considerably increased by the leverage action which results when moving force is applied to the end of one of the arms 27 and 28. This leverage action tends to separate the detent elements.

FIG. 6 presents the case where the magnetic element 18, which is mounted in the track, is formed of material which has been magnetized so as to have periodic alternations in polarity along its length. The distance between the North-South polar centers is approximately one-half the distance between the grooves or detent elements 15 in the surface 14. The polar centers are, however, offset about half of their North-South polar distance from the center line of the grooves which, as shown in FIG. 6, provides a South pole slightly to the left of each groove 23 and a North pole slightly to the right of each groove 23. If the magnetic element 17 mounted in the indicating means 13 is approximately the length of the North-South polar distance in the magnetic element 18. The magnetic element 17 is itself a magnet having poles on its horizontal ends (more specifically, the North pole to the left and the South pole to the right). The indicating means 13 will be attracted to the magnetic element 18 when the indicating means is approximately in one of the discrete locations. The indicating element 13 will be repulsed by the magnetic element 18 when the indicating means is located between such discrete locations. The nature of these attracting and repulsing forces are such that the indicating means will not remain in an intermediate position between the discrete locations and, if placed in such an intermediate position, will immediately move to one of the discrete locations on either side. Once in the vicinity of a discrete location, the engagement of the detent elements will precisely position the indicating means regardless of any imperfection in the initial positioning caused by the magnetic forces. It has been found that the use of a base of steel or other magnetic material enhances the alternations of polarity and causes the attraction-repulsion effect to be even stronger.

The formation of the detent element 16 as a protuberance with a semi-circular cross-section and the detent element 15 as a similarly-shaped notch or groove means that lateral pressure (longitudinally of the track) causes the element 16 to cam or climb out of the groove. In other words, it only requires a gentle pressure to cause the condition to change from that of indicating means 13 of FIG. 6 to that of indicating means 13'.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Signal device, comprising:
   (a) a track of an extruded U-shaped cross-section with a bottom wall and two spaced, parallel side walls, the bottom wall having a track surface adjacent each side wall,
   (b) an indicator slidable in the track and having an inner surface facing the bottom wall of the track, a strip of the inner surface along each side wall engaging a corresponding track surface of the track,
   (c) an elongated magnetic element embedded in the bottom wall of the track and having alternating magnetic poles located at discrete positions along its length, and
   (d) a magnetic element embedded in the indicator at said inner surface,
      a series of notches formed in the track surfaces at said discrete positions and a protuberance formed along each edge of the inner surface of the indicator for engagement with one of said notches on occasion, whereby the magnetic elements attract when the indicator is located at a discrete position and the magnetic elements repel when the indicator is located between discrete positions.

2. Signal device as recited in claim 1, wherein the side walls of the track are formed with inwardly-facing grooves and the opposite sides of the indicator are provided with rails that slide longitudinally in the grooves, the width of the grooves in the direction perpendicular to the bottom wall being such as to allow limited movement of the indicator away from the bottom wall.

3. A signal device for attachment to an object movable in a conveyor system, comprising:
   (a) a track with a surface having at least one first mechanical detent element in a bottom portion thereof,
   (b) an indicating member having a second mechanical detent element which is shape-conforming to the first detent element, the indicating member also having a first magnetic element, and
   (c) a separate second magnetic element having first and second magnetic portions fixed adjacent to the surface of the track, said first magnetic portion being located adjacent the first mechanical detent element and magnetically attracting a magnetic portion of said first magnetic element, thereby causing a shape-conforming engagement between the first and second mechanical detent elements, the second magnetic element having a second magnetic portion spaced from the first detent element, at least said second magnetic portion selectively magnetically repelling like magnetic portions of the first magnetic element, because of the arrangement of its polarity.

4. A signal device as recited in claim 3, wherein a plurality of parallel tracks are provided each having at least one indicating means slidably locked in it.

5. A signal device as recited in claim 3, wherein the surface includes a plurality of first detent elements each having at least a said first magnetic portion adjacent it.

6. A signal device as recited in claim 5, wherein an uninterrupted part of the surface lies between each first detent element and each uninterrupted part has a second magnetic portion adjacent it.

7. A signal device as recited in claim 3, wherein the indicating means carries a piece of retro-reflective material.

8. A signal device as recited in claim 3, wherein the track is mounted on a base of magnetically-attractive material.

9. A signal device as recited in claim 3, wherein the first and second detent elements are semi-circular in shape.

10. A signal device as recited in claim 3, wherein the track and the indicating element other than the first magnetic element are formed of a non-magnetic material.

11. A signal device as recited in claim 3, wherein the track includes two parallel opposed grooves, each groove having a width, and the indicating means has a rail which engages each groove but which is of width smaller than the width of the groove.

12. A signal device as recited in claim 11, wherein a stop block is provided which has block detent elements and which has block rails similar to those of the indicating means except that the width of the block rails are equal to that of the grooves.

13. A signal device for attachment to the surface of an object movable in a conveyor system, comprising:
   (a) an elongated track with a bottom surface having a first mechanical detent element,
   (b) an indicating means having a retro-reflective surface and having a second mechanical detent element which is shape-conforming to the first mechanical detent element, said indicating means also having a first magnetic element, the elongated track extending parallel to the line of movement and the indicating means being carried by the track for selective slidable movement parallel to the line along the track, and
   (c) a second magnetic element fixed adjacent to the surface of the elongated track and having a first and second magnetic portion adjacent the first detent element, at least said first magnetic portion magnetically attracting at least one of the magnetic portions of said first magnetic element and thereby producing a shape-conforming engagement between the first and the second detent elements.

14. A signal device as recited in claim 13, wherein the second magnetic element has the second portion spaced from the first detent element, said second portion magnetically repelling the other portion of the first magnetic element, because of the arrangement of the relative polarity of the magnetic elements.

15. A signal device as recited in claim 13, wherein a plurality of parallel tracks are provided, each having at least one indicating means slidably locked in it.

16. A signal device as recited in claim 13, wherein the surface includes a plurality of first detent elements each having a first magnetic portion adjacent it.

17. A signal device as recited in claim 16, wherein a smooth part of the surface lies between each first detent element and each smooth part has a second portion adjacent it.

18. A signal device as recited in claim 13, wherein the surface is mounted on a ferrous base.

19. A signal device as recited in claim 13, wherein the first and second detent elements are semi-circular in shape.

20. A signal device as recited in claim 13, wherein the track, the surface, and the indicating element other than the first magnetic element are formed of a non-magnetic material.

21. A signal device as recited in claim 13, wherein the track includes two parallel opposed grooves, each groove having a width, and the indicating means has a rail which engages each groove but which is of width smaller than the width of the groove.

22. A signal device as recited in claim 21, wherein a block is provided which has block detent elements and block rails similar to those of the indicating means except that the width of the block rails are equal to the grooves.

* * * * *